UNITED STATES PATENT OFFICE.

CHARLES C. RINGLER AND JOHN BEERHALTER, OF DULUTH, MINNESOTA, ASSIGNORS OF THIRTY-THREE AND ONE-THIRD ONE-HUNDREDTHS TO FITGER BREWING COMPANY, OF DULUTH, MINNESOTA, A CORPORATION OF MINNESOTA.

METHOD OF EXTRACTING AND MODIFYING PROTEINS OR ALBUMINOUS MATTER.

1,213,545.   Specification of Letters Patent.   Patented Jan. 23, 1917.

No Drawing.   Application filed March 13, 1916. Serial No. 83,873.

*To all whom it may concern:*

Be it known that we, CHARLES C. RINGLER and JOHN BEERHALTER, citizens of the United States, and residents of Duluth, in the county of St. Louis and State of Minnesota, have invented a new and Improved Method of Extracting and Modifying Proteins or Albuminous Matter, of which the following is a full, clear, and exact description.

Our invention relates to a method of extracting and modifying protein or albuminous matter from substances containing it, and is particularly adaptable to the extraction and modification of protein or albuminous matter from yeast cells.

Before proceeding to a more detailed description of our invention it must be clearly understood that although the description of the method is specific as to the extraction and modification of protein from brewers' yeast, the method is by no means limited to this particular substance and can be as efficiently utilized with any substance containing protein or albuminous matter. By "modification" is meant the chemical reaction of ammonia on the albuminous constituents, which prevents coagulation and keeps them in solution.

Yeasts grown by fermentation are generally contaminated with substances of the extract fermented that may give a disagreeable taste to the yeast. This contaminating substance can be dissolved chemically or removed mechanically. Yeast resulting from the fermentation of malt or other brewing extracts which have been hopped during the brewing operation is contaminated with hop resin. The resins are preferably eliminated by the addition of alkalis or mechanically by forcing the yeast through a suitable filtering surface which will retain the resins.

The yeast treated as above is digested with a solution of ammonia (ammonium hydrate), preferably under pressure and while subjected to heat; or in lieu of pressure and heat steam may be used. The pressure and heat help to weaken the cellular structure of the yeast and facilitate the action of the ammonia in solution on the contents of the cells, which are protein or albuminous matter. The cellulose matter of the yeast precipitates rapidly in the solution and the liquid may be drawn off.

The treatment of the yeast with ammonia under pressure and with heat must be to exclusion of oxidizing agents. The excess of ammonia is removed by reduction of pressure in the digester or in a special vacuum evaporator. The resulting extract is a protein or albuminous substance and is available in a solution form, particularly for enriching beverages normally lacking in protein. It may be used as a food *per se*, unadulterated, or adulterated, if desired, with any suitable substance to render it more attractive or palatable.

We claim:

1. A method of extracting and modifying protein or albuminous matter from yeast, which consists in digesting the yeast with a solution of ammonia to dissolve the protein contained therein, removing the excess of ammonia by evaporation, and separating the solution from the sediment.

2. A method of extracting and modifying protein from yeast, which consists in digesting the yeast under pressure with a solution of ammonia to dissolve the protein contained in the yeast, then removing the excess of ammonia by evaporation, and separating the resulting solution from the sediment.

3. A method of extracting and modifying protein or albuminous matter from yeast, which consists in digesting the yeast, subjected to pressure and heat, with an ammonia solution to dissolve the protein contained in the yeast, removing the excess of ammonia, and separating the resulting solution from the sediment.

4. A method of extracting and modifying protein or albuminous matter from brewers' yeast, which consists in eliminating from the yeast the substances contaminating it, digesting the so treated yeast with an ammonia solution, while subjected to pressure and heat, to dissolve the protein contained in the yeast, removing the excess of ammonia, and separating the resulting solution from the sediment.

5. A method of extracting and modifying protein or albuminous matter from brewers' yeast, which consists in eliminating the hop resins from the yeast, digesting the so-treated yeast with an ammonia solution, while subjected to pressure and heat, to dissolve the protein contained in the yeast, and separating the resulting solution from the sediment.

6. A method of extracting and modifying protein or albuminous matter from brewers' yeast, which consists in treating the yeast with alkalis to dissolve the hop resins contained in the yeast, digesting the so-treated yeast with an ammonia solution while subjected to pressure and heat, and separating the resulting solution from the sediment.

In testimony whereof we have signed our names to this specification in the presence of two subscribing witnesses.

CHARLES C. RINGLER.
JOHN BEERHALTER.

Witnesses:
L. M. HANSON,
ANTHONY S. SCHMID.